US012016270B2

(12) United States Patent
Theisen et al.

(10) Patent No.: US 12,016,270 B2
(45) Date of Patent: Jun. 25, 2024

(54) CONCAVE WITH ADJUSTABLE OPENINGS

(71) Applicants: Andrew J. Theisen, Fond du Lac, WI (US); Keith A. Johnson, West Bend, WI (US); Neal J. Stoffel, Campbellsport, WI (US); Joseph W. Schaffer, Sr., Colgate, WI (US)

(72) Inventors: Andrew J. Theisen, Fond du Lac, WI (US); Keith A. Johnson, West Bend, WI (US); Neal J. Stoffel, Campbellsport, WI (US); Joseph W. Schaffer, Sr., Colgate, WI (US)

(73) Assignee: Kondex Corporation, Lomira, WI (US)

( * ) Notice: Subject to any disclaimer, the term of this patent is extended or adjusted under 35 U.S.C. 154(b) by 0 days.

(21) Appl. No.: 17/954,902

(22) Filed: Sep. 28, 2022

(65) Prior Publication Data
US 2023/0024887 A1 Jan. 26, 2023

Related U.S. Application Data

(63) Continuation of application No. 16/413,876, filed on May 16, 2019, now Pat. No. 11,497,171.
(Continued)

(51) Int. Cl.
*A01F 12/26* (2006.01)
*A01F 12/44* (2006.01)
(Continued)

(52) U.S. Cl.
CPC ............ *A01F 12/26* (2013.01); *A01F 12/448* (2013.01); *A01D 69/06* (2013.01); *A01D 75/28* (2013.01); *A01F 12/181* (2013.01); *A01F 12/28* (2013.01)

(58) Field of Classification Search
CPC ...... A01F 12/26; A01F 12/448; A01F 12/181; A01F 12/28; A01F 12/24; A01D 69/06; A01D 75/28
See application file for complete search history.

(56) References Cited

U.S. PATENT DOCUMENTS 2,053,148 A * 9/1936 James ................. A01F 7/06
460/109
2,159,664 A 5/1939 Lindgren
(Continued)

FOREIGN PATENT DOCUMENTS

CN 104798529 B 9/2017
DE 3017988 A1 11/1981
(Continued)

OTHER PUBLICATIONS

U.S. Appl. No. 16/413,876, filed May 16, 2019.

*Primary Examiner* — Arpad Fabian-Kovacs
(74) *Attorney, Agent, or Firm* — Reinhart Boerner Van Deuren P.C.

(57) ABSTRACT

A concave section for a harvester includes a concave body having an upstream side, a downstream side, a leading end and a trailing end. The concave body defines an arcuate crop engagement face facing radially inwardly. A plurality of crop passage openings are defined through the arcuate crop engagement face. A cover is configured to at least partially cover at least some of the crop passage openings. The cover is carried by the concave body and is movable thereon between at least two different positions to adjust a degree of openness of at least some of the crop passage openings.

31 Claims, 13 Drawing Sheets

Related U.S. Application Data

(60) Provisional application No. 62/690,258, filed on Jun. 26, 2018.

(51) Int. Cl.
    *A01D 69/06*         (2006.01)
    *A01D 75/28*         (2006.01)
    *A01F 12/18*          (2006.01)
    *A01F 12/28*          (2006.01)

(56) References Cited

U.S. PATENT DOCUMENTS

| | | |
|---|---|---|
| 2,305,964 A | 12/1942 | Harrison et al. |
| 2,686,523 A | 8/1954 | Young |
| 3,537,459 A | 11/1970 | Thomas |
| 4,004,404 A * | 1/1977 | Rowland-Hill ......... A01F 12/24 460/110 |
| 4,274,426 A * | 6/1981 | Williams ................ A01F 7/062 460/67 |
| 4,284,086 A | 8/1981 | Williams |
| 6,193,604 B1 | 2/2001 | Ramp et al. |
| 6,530,833 B2 | 3/2003 | Imel et al. |
| 6,537,148 B2 | 3/2003 | Schwersmann |
| 7,749,055 B2 | 7/2010 | Ricketts |
| D624,939 S | 10/2010 | Flickinger et al. |
| 8,313,361 B2 | 11/2012 | Flickinger et al. |
| 8,454,416 B1 | 6/2013 | Estes |
| D687,659 S | 8/2013 | MacKenzie |
| 8,690,652 B1 | 4/2014 | Estes |
| 8,721,411 B2 | 5/2014 | Reiger et al. |
| 9,504,204 B2 | 11/2016 | Kile |
| 10,045,487 B1 | 8/2018 | Robertson |
| 10,085,378 B2 | 10/2018 | Farley et al. |
| 10,412,895 B2 | 9/2019 | Theisen et al. |
| 10,779,474 B2 | 9/2020 | Ritter |
| D901,546 S | 11/2020 | Robertson |
| 2002/0144491 A1 | 10/2002 | Holtmann et al. |
| 2006/0128452 A1 | 6/2006 | Esken et al. |
| 2014/0171164 A1 | 6/2014 | Foster et al. |
| 2017/0099772 A1 | 4/2017 | Farley et al. |
| 2018/0027732 A1 | 2/2018 | Xu et al. |
| 2018/0103588 A1 | 4/2018 | Ritter |
| 2019/0166767 A1 * | 6/2019 | Robertson ............... A01F 12/26 |
| 2019/0166768 A1 | 6/2019 | Robertson |
| 2020/0253126 A1 | 8/2020 | Robertson |

FOREIGN PATENT DOCUMENTS

| | | | |
|---|---|---|---|
| DE | 3832996 A1 | 4/1989 | |
| EP | 0085358 A1 * | 8/1983 | ............ A01F 12/39 |
| EP | 1474964 A1 | 11/2004 | |
| EP | 3311652 A1 | 4/2018 | |
| JP | 2005-261304 A | 9/2005 | |
| KR | 19990074146 A | 10/1999 | |
| KR | 20150136754 A | 12/2015 | |
| WO | WO 2014/099956 A1 | 6/2014 | |

\* cited by examiner

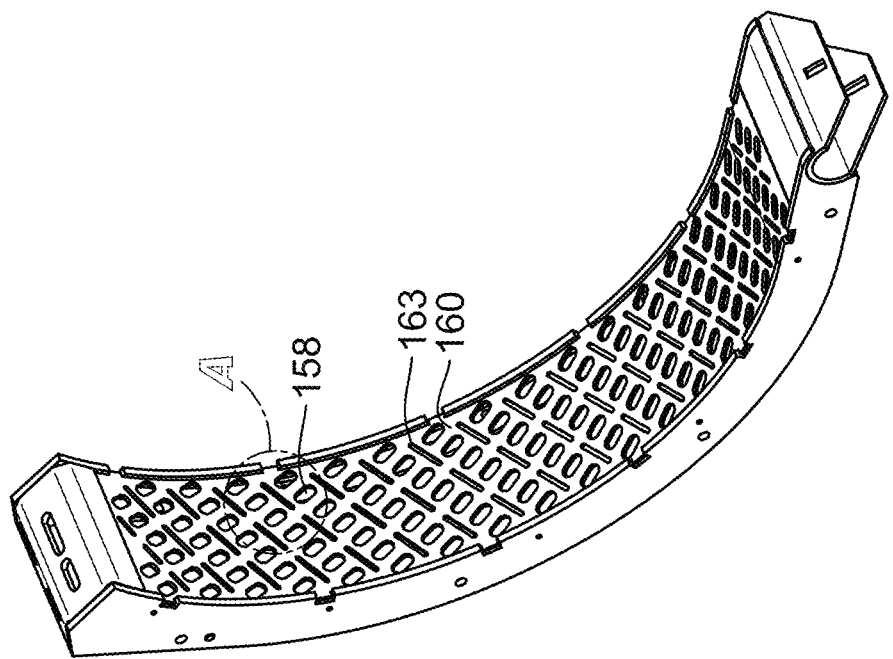
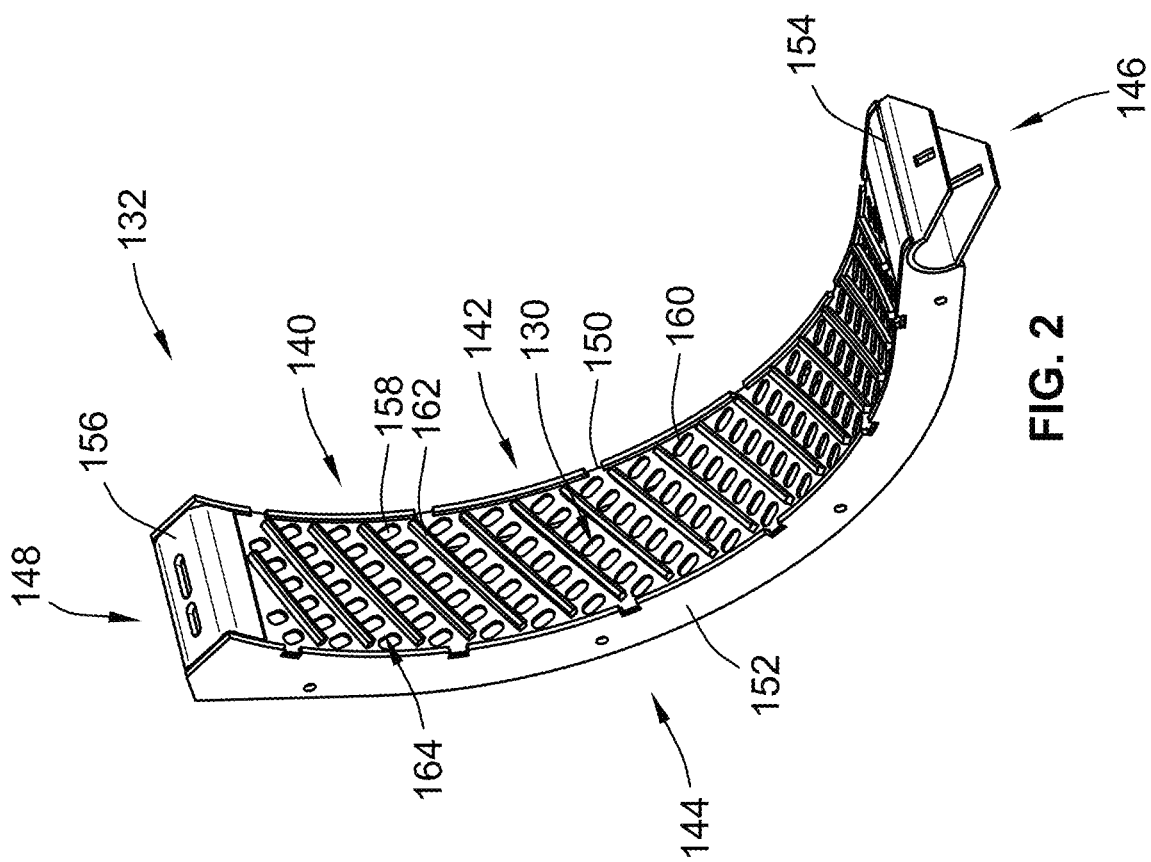

CONCAVE WITH ADJUSTABLE OPENINGS

CROSS-REFERENCE TO RELATED PATENT APPLICATIONS

This patent application is a continuation of co-pending U.S. patent application Ser. No. 16/413,876, filed May 16, 2019, which claims the benefit of U.S. Provisional Patent Application No. 62/690,258, filed Jun. 26, 2018, the entire teachings and disclosure of which are incorporated herein by reference thereto.

FIELD OF THE INVENTION

This invention generally relates to a concave region of a rotary combine harvester and more specifically to concave sections thereof.

BACKGROUND OF THE INVENTION

A rotary combine harvester, that may be referred to as a harvester is utilized to harvest crop from a field, separate the grain from the material other than grain (MOG) and to dispense these materials from the machine appropriately. These harvester tasks are complicated and difficult to accomplish. Indeed, not only do they need to be adapted to separate many different types of grains from MOG but they must also account for different crop conditions and weather conditions in which the harvesters must operate in.

A rotary combine harvester's main threshing and separating system consists of a large cylindrical rotor driven by the machine's main engine. There are threshing elements attached to the rotor that cooperate with stationary elements. The stationary elements are referred to as concaves. The concaves surround the rotor in a rotor cage. Threshing and separating is accomplished by a combination of impact and rubbing action. As the rotor rotates, the grain crop is forced through a gap between the rotor and the concaves and begins a spiral path through the front (threshing) section and then through the rear (separating) section towards the exit area of the rotor/concave system. The impact and rubbing action causes the grains to be detached. By the time the crop is at the exit area almost all the grain has been separated from the MOG. The term for any grain that is remaining is called rotor loss. There are also other losses that can be attributed to the rotor/concave system, this is known as damaged grain loss (broken or cracked kernels).

As with any machine, performance is the key to efficiency. As mentioned above, performance of the threshing mechanisms is measured by: Threshing efficiency; Separating efficiency; and Grain damage. The machine operator has several means to adjust the threshing/separating efficiency vs. grain damage equation. The speed at which the rotor turns (RPM) is adjustable, the gap between the rotor and the concaves is adjustable, and the crop feed rate can be adjusted simply by running more or, less material into the machine. Also, the condition of the crop itself can have a dramatic effect on the loss vs. damage ratio. Crop moisture content, crop maturity, and crop type profoundly affect the machine performance. Along with all these variables and possible adjustments, the operator still might not get the machine to perform to acceptable levels of grain separated from the MOG during threshing. Indeed, producers are penalized for grain deliveries having MOG beyond acceptable levels. At this point the owner or operator may start looking at threshing/separating components they might install in place of conventional components.

Typically, new rotary combine harvesters will have installed a standard set of concaves, depending on the original equipment manufacturer. Present difficulties with current designs include concaves which do not sufficiently or properly separate the grain from MOG as the crop material continues its spiral flow.

BRIEF SUMMARY OF THE INVENTION

In one aspect, an embodiment of the invention provides a concave section for a harvester. The concave section has a concave body having an upstream side, a downstream side, a leading end and a trailing end. The concave body defines an arcuate crop engagement face facing radially inwardly. A plurality of crop passage openings are defined through the arcuate crop engagement face. A cover is configured to at least partially cover at least some of the crop passage openings. The cover is carried by the concave body and movable thereon between at least two different positions to adjust a degree of openness of at least some of the crop passage openings.

A slide assembly may secure the cover to the concave body. The cover may be slideable relative to the concave body to selectively cover at least some of the crop passage openings.

A lock member may be arranged to lock the position of the cover among the at least two different positions and fix the degree of openness when locked. The lock member has an unlocked position allowing sliding movement.

In an embodiment, the lock member comprises a clamp supported by the concave body, releasably clamping the cover to the concave body.

A drive portion may be provided on the cover that is actuable to allow movement of the cover relative to the concave body.

In an embodiment, the drive portion comprises at least one drive lug provided by the cover.

In an embodiment, a leverage member may be arranged relative to the drive lug in a spaced relationship that allows manual adjustment using a tool acting upon the drive lug and the leverage member.

In an alternative embodiment, an actuator is arranged for remote automated position control of the cover relative to the concave body to control the degree of openness.

A plurality of rub bars may define the arcuate crop engagement face. The rub bars extend laterally between the upstream side and the downstream side and are arranged in spaced relation between the leading and trailing end. The openings are defined between adjacent rub bars. The cover is disposed radially outwardly of the rub bars.

In an embodiment, an arcuate support plate is radially outboard of the rub bars and supporting the rub bars. The arcuate support plate further defines the arcuate crop engagement face. The arcuate support plate defines the crop passage openings with a plurality of slots that are coverable between adjacent pairs of rub bars. The cover is disposed radially outwardly of the arcuate support plate.

In another embodiment, the arcuate crop engagement face can be provided by a concave arrangement of rub bars alone.

The cover may define a plurality of corresponding slots, with a solid cover portion extending between corresponding slots, wherein the corresponding slots are arranged to align with the slots of the arcuate plate to allow passage of crop material, and wherein the solid cover portion at least partially covers the slots of the arcuate plate to at least partially close the slots of the arcuate plate.

In an embodiment, the cover includes a slotted cover plate. The arcuate plate of the concave section has a first radial thickness. The slotted cover plate has a second radial thickness. The second radial thickness is thinner than the first radial thickness by between 10 and 75% of the first radial thickness. Advantageously, the cover's thinness minimizes weight increase to make the concave section serviceable.

In an embodiment, the concave body includes an upstream side plate providing the upstream side, a downstream side plate providing the downstream side, a leading end assembly providing the leading end and a trailing end assembly providing the trailing end. The upstream side plate and the downstream side plate extend in parallel relation between the leading end assembly and the trailing end assembly, and wherein the arcuate crop engagement face extends laterally between the upstream side plate and the downstream side plate with the cover comprising a slotted arcuate plate arranged behind the arcuate crop engagement face.

Retainers may retain the slotted arcuate plate to the concave body. The slotted arcuate plate is slidable relative to concave body while retained thereto by the retainers.

In an embodiment, the retainers comprise a plurality of shoulder bolts having head portions over the slotted arcuate plate to retain the slotted arcuate plate to the concave body. A lock fastener releasably locks the slotted arcuate plate to the concave body.

The retainers can guide sliding movement of the arcuate plate in a circumferential direction between the leading end and the trailing end to adjust the degree of openness.

Preferably, the cover has a fully open position on the concave body maintaining the crop passage openings at the degree of openness that is fully open and a closed position on the concave body maintaining the crop passage openings at the degree of openness that is fully closed.

Preferably, the cover is further movable on the concave body between at least one intermediate position between fully open and closed positions. The cover when in at least one intermediate position only partially covers at least some of the crop passage openings.

Also preferably, the cover is configured to at least partially cover all of the crop passage openings.

In an embodiment, a harvester is provided that includes the concave section. The harvester includes a bin. The harvester has a head at a front of the vehicle for engaging a crop to remove crop material. A rotor is interposed between the bin and the head. The rotor is proximate the concave section in a concave region. The concave region includes at least four concave sections arranged in downstream fashion from leading threshing concaves closest to the head to trailing separating concaves farthest from the head. The rotor has a spiral engaging element facing the concave sections operable to impart a rotational spiral flow of crop material against a first of the four leading threshing concaves. The degree of openness controls and optionally limits an amount of threshing occurring in leading threshing concaves.

The concave section with the cover feature is particularly advantageous when located in the threshing region of the concave region where control over separation is more advantageous.

In another aspect, an embodiment of the invention provides a concave section for a harvester that includes a concave body defining a plurality of crop passage openings. The concave section also includes a cover movably mounted to the concave body. The cover is movable between a first position and a second position to selectively uncover or cover of at least some of the crop passage openings.

The first position may be a fully open position on the concave body maintaining the crop passage openings at the degree of openness that is fully open. The second position may be a closed position on the concave body maintaining the crop passage openings at the degree of openness that is fully closed.

Preferably, the cover includes a plurality of intermediate positions between fully open and closed positions. The cover when in at least one intermediate positions only partially covers at least some of the crop passage openings. The cover with each intermediate position achieves a different level of partial coverage.

The cover may be infinitely adjustable relative to the concave body to allow infinite coverage adjustment of the crop passage openings.

The cover may include a slotted arcuate plate. Retainers retain the slotted arcuate plate to the concave body. The slotted arcuate plate is slideable relative to concave body while retained thereto by the retainers.

A lock member may be arranged to lock the position of the cover among first and second positions and fix the degree of openness when locked. The lock member has an unlocked position allowing sliding movement.

The concave section can include means for manually or automatically actuating movement of the cover between first and second positions. Such means may include a drive section that is manually actuable or an actuator.

In yet another aspect, an embodiment of the invention provides a concave section for a harvester. The concave section includes a concave body defining a plurality of crop passage openings. The concave section includes means for adjustably covering the crop passage openings.

In still another aspect, in an embodiment, the cover includes a first cover portion and a second cover portion separated by a break such that the first cover portion and second cover portion are separate pieces of the cover.

In an embodiment, the cover in includes a first cover portion and a second cover portion, the first cover portion moveable in a first direction towards the trailing end and a second direction towards the leading end wherein movement of the first cover portion does not move the second cover portion.

In an embodiment, the second cover portions is moveable in the first and second directions and movement of the second cover portion in the first and second directions does not move the first cover portion.

The means may adjustably cover the crop passage openings to completely close the crop passage openings.

The means may adjustably cover the crop passage opening to keep the keep the crop passage openings completely open.

The means may adjustably cover the crop passage openings to partially close the crop passage openings.

The means may include a cover movably mounted to the concave body. The cover is movable to provide the at least partial open position for the crop passage openings and the fully closed position for the crop passage openings.

In an embodiment, the cover includes a first rail and a second rail and a perforated arcuate support plate, the arcuate support plate extending between the first and second rails.

In an embodiment, the first and the second rails are slideable along an upstream side plate and a downstream side plate respectfully and extend there along from proximate a leading end plate to a trailing end plate of the concave body.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings:

FIG. 2 is a perspective view of the concave section of FIG. 1 with an embodiment of a crop engagement face according to the teachings of the instant invention;

FIG. 3 is a perspective view of an intermediate assembly of the concave section of FIG. 2;

FIG. 7A is an enlarged view of the area taken about 7A in FIG. 7;

FIG. 8A is an enlarged view of the area taken about 8A in FIG. 8 further illustrating a manual means such as a drive lug or gear rack for movement of the cover that may be acted upon by a tool;

FIG. 10A is front side perspective view of the cover of the concave section of FIG. 10A.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
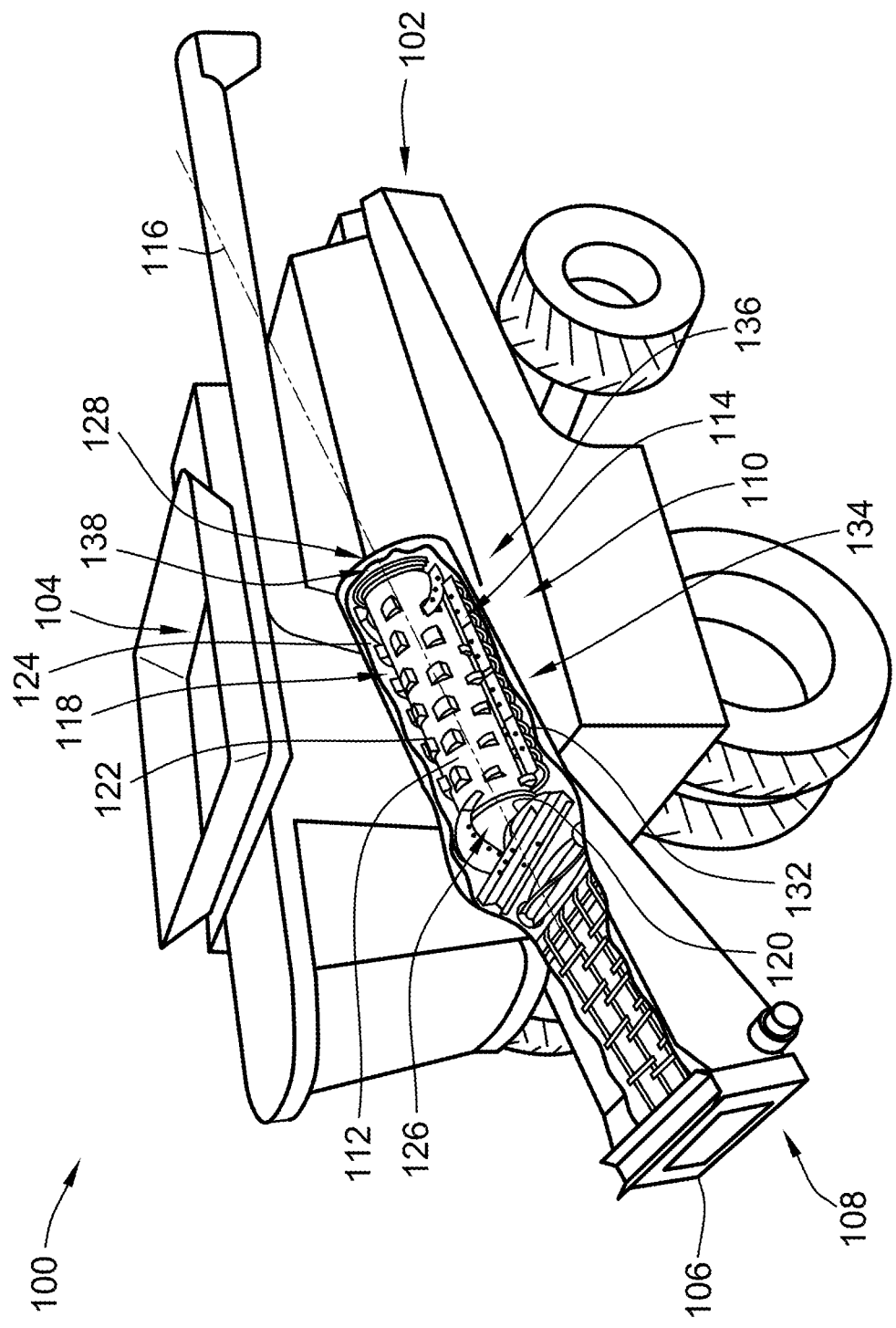
FIG. 1 is a perspective and partly schematic view of a harvester with an embodiment of a concave section according to the teachings of the instant invention.

FIG. 1 illustrates a rotary combine harvester 100, that may be referred to herein as a harvester 100. The harvester 100 includes a vehicle 102 having a bin 104 for storing harvested grain. The harvester 100 further includes a head 106 at a front 108 of the vehicle 102 for engaging a crop to remove as much crop material as possible while retaining its grain.

The harvester 100 includes a threshing and separating system 110 which comprises a rotor 112 and a rotor cage 114 also referred to as a concave region. The rotor cage 114 defines a central rotor axis 116. Further, the rotor cage 114 defines a rotor cavity 118 which surrounds and receives the rotor 112 for rotation about the central rotor axis 116. The rotor 112 is interposed between the bin 104 and the head 106. The rotor 112 has a spiral engagement element 120 facing the rotor cage 114 and is operable to impart a rotational spiral flow of the crop material against the rotor cage 114.

The rotor 112 also includes threshing elements 122 that extend radially away from the central rotor axis 116 to define outermost peripheral surfaces of the rotor 112. A gap 124 is defined between the rotor cage 114 and outermost peripheral surfaces of the threshing elements 122. The crop material with its grain flows through the gap 124 from a rotor front 126 to a rear 128 of the rotor 112 to separate the remaining crop material from its grain. Each one of the threshing elements 122 is positioned to cooperate with a respective crop engagement face (See e.g. 130 at FIG. 2) of a concave section 132, arranged in the rotor cage 114. The impact and rubbing action between the threshing elements 122 and the crop engagement face 130 (FIG. 2) cause the grain to be detached from the crop material. As discussed above, the gap 124 can be adjusted by changing out the threshing element 122 to increase or decrease its radial extension away from the central rotor axis 116. By the time the crop is at the rear 128 of the rotor 112 almost all the grain has been separated from the crop material.

The thresher and separating system 110 generally varies in function as the crop material proceeds from the rotor front 126 to the rear 128 of the rotor 112. The rotor cage 114 at the rotor front 126 can include a thresher region 134 while the rotor cage 114 at the rear 128 can include a separation section 136 and a separator region 138.

The thresher region 134 can include a plurality of concave sections 132. The concave sections 132 have crop engagement faces 130 (FIG. 2) designed to separate the grain from the material other than grain. The number of concave sections 132 can be increased or decreased within the thresher region 134 to increase or decrease the amount of desired threshing.

The separation section 136 can also include a plurality of concave sections similar to threshing concave 132 such as concave sections with separator crop engagement faces 230 (FIG. 10) that differ in profile from those in the threshing region 134 so as to provide for a less harsh action on the grain relative to the threshing region 134. The more gentle separation provided by crop engagement faces 230 (FIG. 10) prevents damage to the grain that may be more vulnerable to damage because the material other than grain has been partially removed in the thresher region 134.

Figure 10:
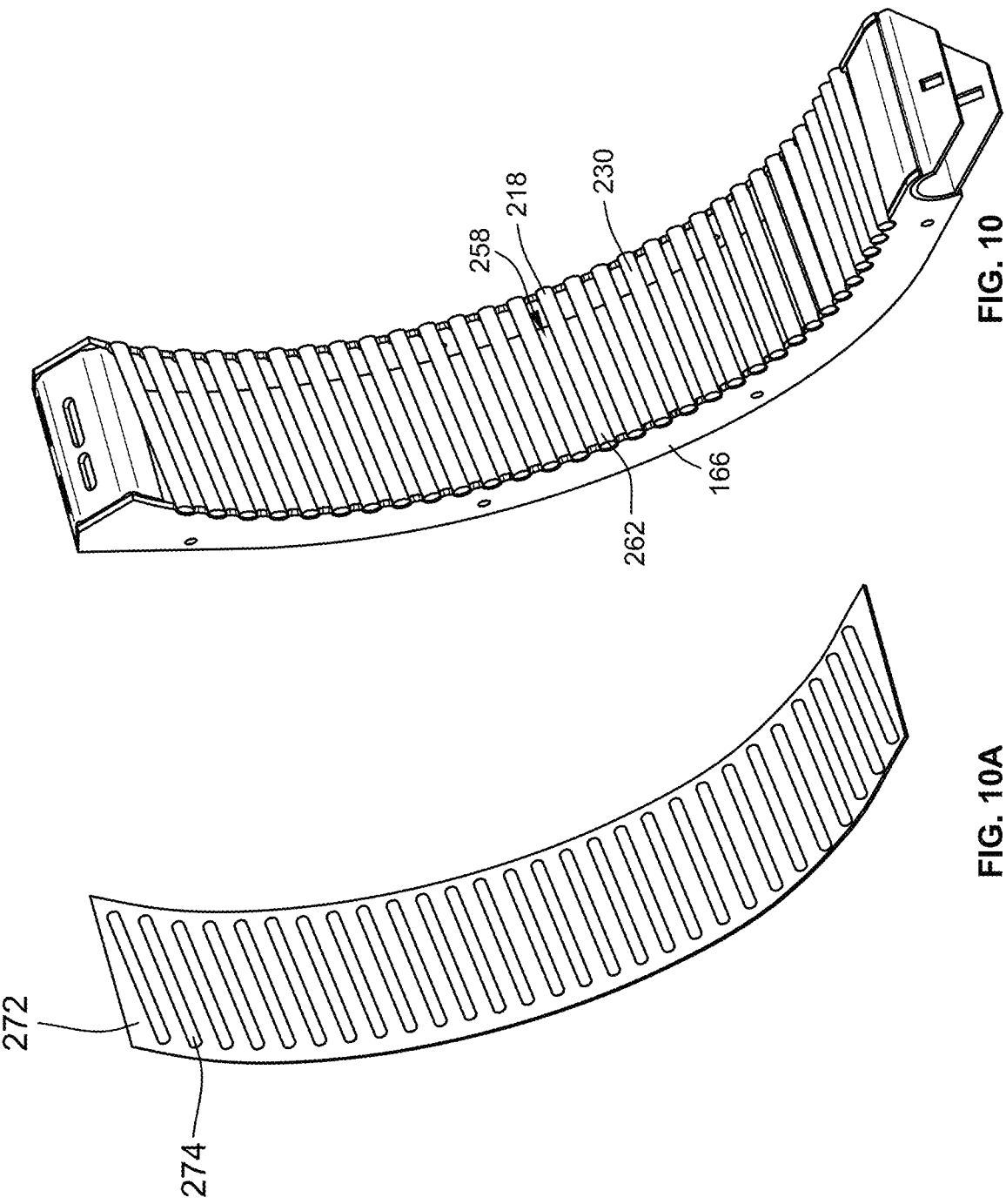
FIG. 10 is a front side perspective view of an alternative embodiment of the concave section for the harvester of FIG. 1 with a different crop engagement face.

The separator region 138 is generally located at the rear 128 of the rotor cage 114 downstream of the separator section 136 but may also be located between thresher region 134 and separator sections 136. The separator region 138 may be made up of concave sections similar to concave sections 132 or configurations as shown in FIG. 10 or similar structures that can include elements such as tines. It is not the intent to describe more fully the separator region 138 as such separator regions 138 and their location in thresher/ separating systems are generally known and function to further the separation of grain from the material other than grain.

Use of the term "upstream" and "downstream" is relative to the flow of crop material from the rotor front 126 to the rear 128 of the rotor 114. The terms "leading" and "trailing" refer to a structure in rotation, here about central rotor axis 116. "Leading" and "trailing" is relative to where the crop material first engages the concave section 132. In other words, the crop material first engages the concave section 132 is leading and where the concave last engages the crop is "trailing."

FIG. 2 illustrates the concave section 132 according to an embodiment of the instant invention. Concave section 132 includes a concave body 140 defining an upstream side 142, a downstream side 144, a leading end 146 and a trailing end 148. Upstream side plate 150 may provide the upstream side 142 and downstream side plate 152 may provide the downstream side 144. An arcuate support plate 160 extends between and may be coupled to, for example by weldment, to the upstream side plate 150 and downstream side plate 152. Leading end plate assembly 154 couples the upstream side plate 150 and the downstream side plate 152 at the leading end 146. Trailing end plate assembly 156 couples the upstream side plate 150 and the downstream side plate 152 at trailing end 148.

Concave section 132 is arcuate to facilitate its placement in the harvester 100 (FIG. 1) around the central rotor axis 116. Accordingly, crop engagement face 130, upstream side plate 150 and downstream side plate 152 are arcuate such that a radius extending from the central rotor axis 116 provides their curvature/circumference. As illustrated, the upstream side plate 150 and the downstream side plate 152 extend in parallel relation between the leading end plate assembly 154 and the trailing end plate assembly 156.

Rub bars 162 are indirectly coupled to the upstream and the downstream sideplates 150, 152 via the arcuate support plate 160. More specifically, the arcuate support plate 160 defines weldment cut outs 163 (FIG. 3) that advantageously lighten the overall weight of the concave section 132 while providing mounting apertures to facilitate weldment of the rub bars 162. The rub bars 162 may be generally rectangular in shape to maximize threshing. Crop passage openings 158 can be defined between rub bars 162 and/or by the arcuate support plate 160 and extend between the upstream and the downstream sideplates 150, 152. Further, the crop passage openings 158 extend in rows between adjacent rub bars 162 from the first leading end 146 toward the first trailing end 156. Accordingly, in an embodiment, the crop engagement face 130 can be defined by the actuate support plate 160 with its crop passage openings 158 and the rub bars 162.

FIG. 3 illustrates an intermediate assembly of the concave section 132 of FIG. 2. FIG. 3 illustrates the concave section 132 with the rub bars 162 removed to reveal the weldment cut outs 163. Once the rub bars 162 are welded to the arcuate support plate 162 the weldment cut outs are completely closed.

With reference now to FIG. 2 the crop engagement face 130 includes the arcuate support plate 160 providing the crop passage openings 158 and includes the rub bars 162. In still further embodiments, the concave section 132 may not include arcuate support plate 160. Where there is no arcuate support plate 160 the rub bars 162 may be directly coupled to the upstream and the downstream side plates, 150, 152 such that the crop passage openings 158 are defined between adjacent rub bars 162, that is, the crop passage openings 158 are the gaps 164 having no solid portions between adjacent rub bars 162. For example, this is described later with reference to FIG. 10.

Figure 4:
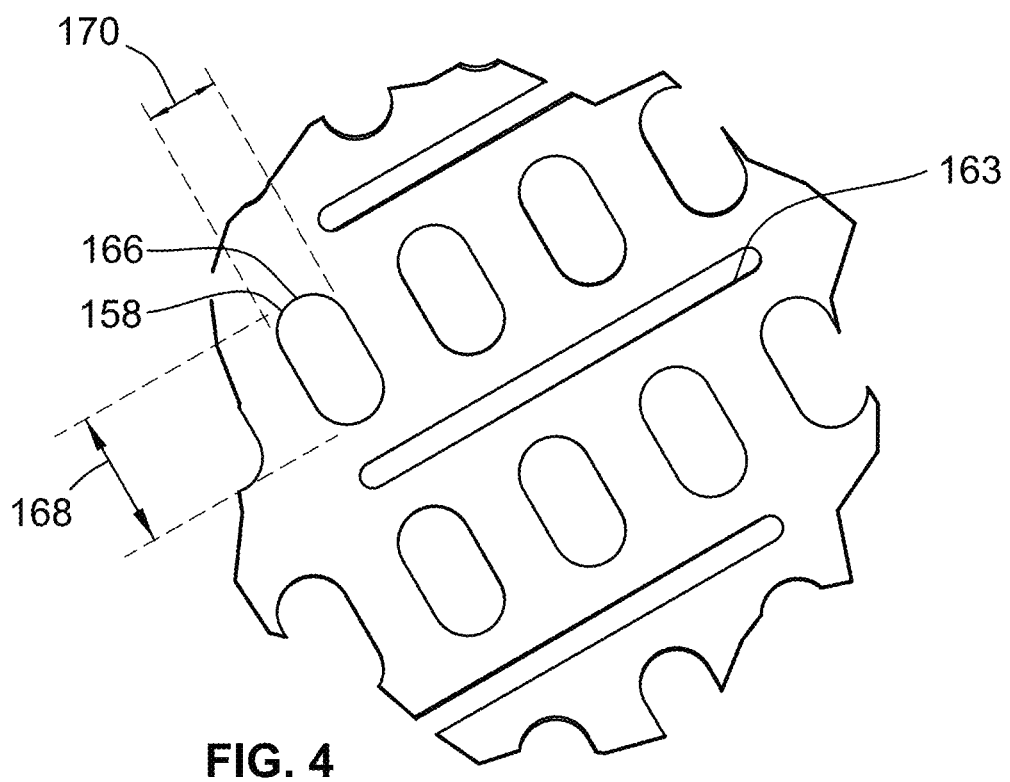
FIG. 4 is an enlarged view of the area "A" of the intermediate assembly of FIG. 3.

The crop passage openings 158 typically have a wide range of area sizes of between 1 to 60 square centimeters. Where the crop passage openings 158 are defined between adjacent rub bars 162, they typically are separated at a spacing forming the gaps 164 of between 2 and 10 centimeters between adjacent rub bars 162. As illustrated in FIGS. 2 and 3, the crop passage openings 158 are formed as slots 166, they more preferably have an area size between 1 to 12 square centimeters for most grain crops. Further, FIG. 4 illustrates the slots 166 have an elongated length 168 preferably between 0.5 and 8 centimeters and a slot width 170 of between 0.3 and 3 centimeters, with typically a length to width ratio of between 1 and 5. In still further embodiments it is envisioned that the crop passage openings 158 may be round slots.

Figures 5, 5A:
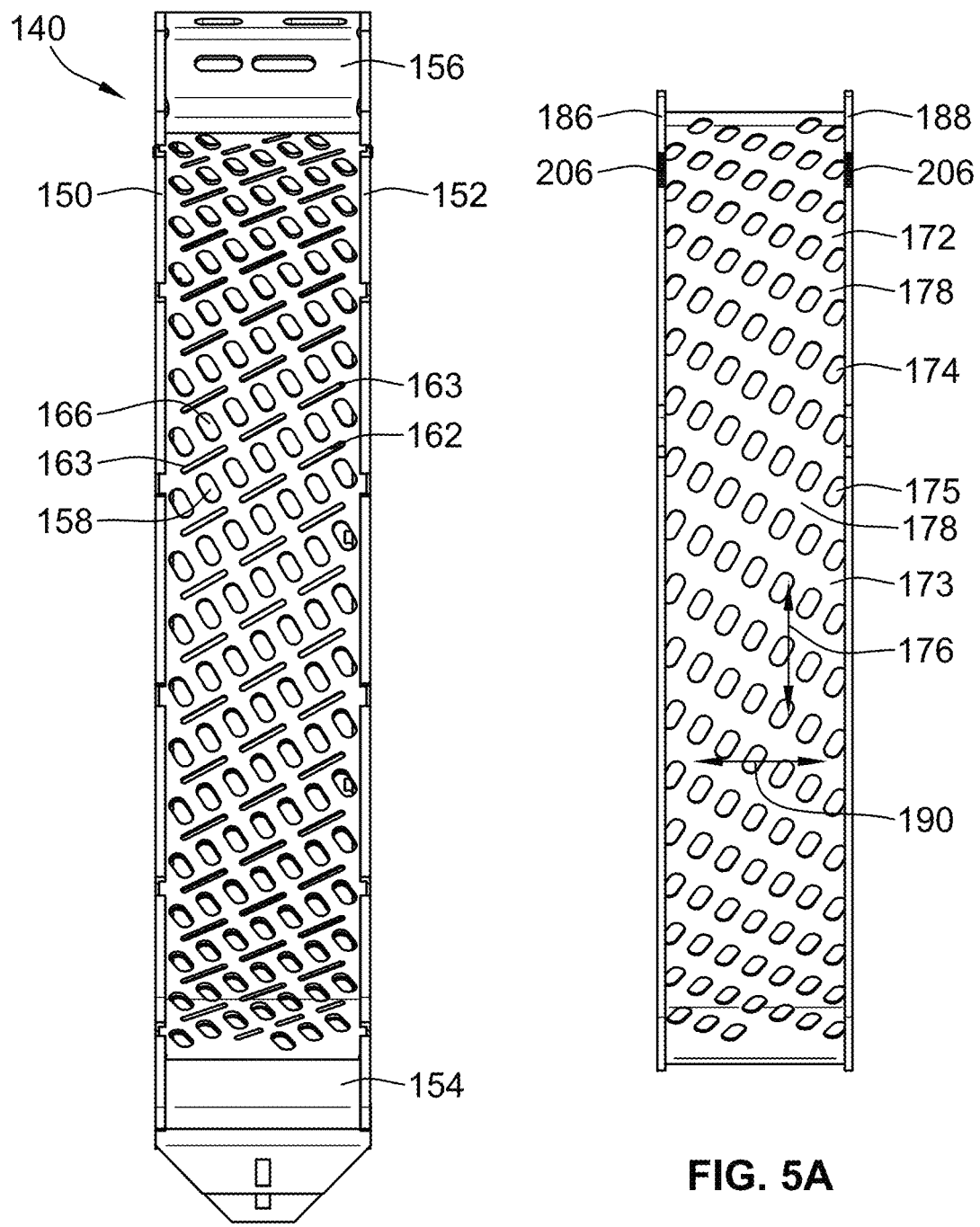
FIG. 5 is a rear view of the concave section of FIG. 2 with the cover removed.
FIG. 5A is a rear view of the cover of a portion of the arcuate plate and a portion of the concave section of FIG. 2.

FIG. 5 illustrates a rear view of the concave section 132 of FIG. 2 with a cover 172 (FIG. 5A) removed such that the back of the arcuate support plate and rub bars 162 are visible. With respect to FIGS. 5 and 5A, the cover 172 is a perforated arcuate plate 173 defining corresponding crop openings 174. The cover 172 is arranged behind the crop engagement face 130 that is arcuate (FIG. 2), that is, the cover 172 is arranged radially outward/outboard of the arcuate support plate 160 relative to the central rotor axis 116 (FIG. 1).

The cover 172 is carried by the concave body 140 and movable thereon between at least two different positions to adjust a degree of openness of at least some of the crop passage openings 158. Therefore, the cover 172 is configured to at least partially cover at least some of the crop passage openings 158. More specifically, corresponding crop openings 174 preferably correspond to and match the same configuration and geometry as the crop passage openings 158. Accordingly, in the embodiment illustrated, the corresponding crop openings 174 are corresponding slots 175 slots that are sized and arranged like the slots 166 defined by the arcuate support plate 160. Further, the cover 172 defines a solid cover portion 178 that extends between corresponding crop openings 174 from the leading end plate assembly 154 to the trailing end plate assembly 156.

The corresponding crop openings 174 are arranged by movement of the cover 172 in a circumferential direction 176 relative to the arcuate support plate 160 to align with the slots 166 of the arcuate support plate 160 to allow passage of crop material. By movement in a circumferential direction 176 it is meant towards and away from the leading end plate assembly 154. Accordingly, the cover 172 may be moved relative to the arcuate support plate 160 to at least partially cover the slots 166 of the arcuate support plate 160 to at least partially close the slots 166 of the arcuate support plate 160.

However, rather than more circumferentially, in another embodiment the cover 172 could move laterally in the direction of the central rotor axis 116.

In the illustrated embodiment involving a circumferentially moveable cover, the cover 172 includes a first rail 186 and a second rail 188 and the perforated arcuate plate 173. The perforated support plate 173 extends between the first and second rails 186, 188. The first and the second rails 186, 188 are adjustably moveable along the upstream and downstream side plates 150, 152 and extend longitudinally from proximate the leading end plate assembly 154 to proximate the trailing end plate assembly 156.

In an embodiment the perforated arcuate plate 173 is connected to the first and second rails 186, 188 by weldment.

However, it is not the intent to limit connection via weldment as other means including fasteners for example are envisioned. In yet other embodiments the first and second rails 186, 188 and the perforated arcuate plate 173 may be integral, that is, monolithic and thus formed together. Thus, in the embodiments envisioned, movement of the cover 172 includes movement of the first and second rails 186, 188 and the support plate 173 together in the same direction.

In yet other embodiments, the first and the second rails 186, 188 and the perforated arcuate plate 173 are mounted behind the arcuate support plate 160 such that movement of the cover 172 in a transverse direction 190, that is, in a direction such that the cover 172 moves toward or away from the upstream and downstream side plates 150, 152 relative to the arcuate support plate 160 results in a fully open area, fully closed area, or a partially open and partially closed area. By fully open area it is meant the crop material is allowed to pass through the crop passage opening 158 and the corresponding crop openings 174 without obstruction by the solid cover portion 178. By fully closed area it is meant that none of the crop material is allowed to pass completely through the crop passage openings 158 and the corresponding crop openings 174 because the solid cover portion 178 sufficiently blocks the crop passage openings 158.

Intermediate positions for the cover 172 are also possible to control a degree of openness between the fully open position and the fully closed position to allow some material passage but less than fully open. In other words, the cover 172 may only partially cover the crop passage opening 158. Indeed, each of the intermediate positions of the cover 172 provide a different level of partial coverage of the crop passage openings which correlates to a different degree of openness provided with each intermediate position to control the amount of grain passing therethrough.

Figure 6:
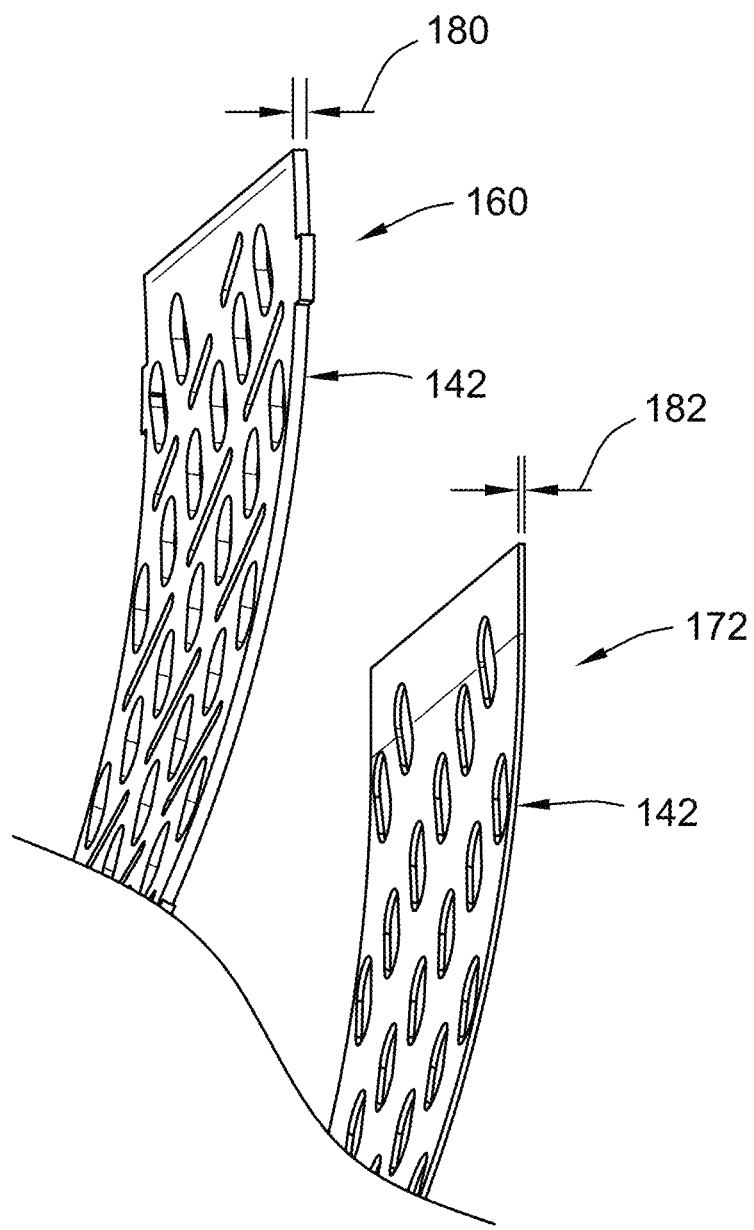
FIG. 6 is a partial view of side of an arcuate support plate and the removed cover of the intermediate assembly of FIG. 3.

FIG. 6 is a partial perspective view of the upstream side 144 of the arcuate support plate 160 and the cover 172. For illustrative purposes, the cover 172 has been removed from behind the actuate support plate 160. The arcuate support plate 160 has a first radial thickness 180. The cover 172 has a second radial thickness 182. The second radial thickness 182 is thinner than the first radial thickness 180 by between 10 and 75% of the first radial thickness, and typically by at least 50% thinner.

The cover 172 presents a light weight solution taking up limited space to provide an advantageous solution for controlling the amount of threshing by presenting greater or less open area through movement of the cover 172 relative to the arcuate support plate 160. Closing the open the area provided by the arcuate support plate 160 with the cover 172 increases the amount of threshing as the grain or other material cannot escape through the corresponding crop openings 174 as readily and is thereby subject to more threshing and thus greater separation of the grain from the material other than grain. Conversely, providing more open area decreases the amount of threshing.

Figure 7:
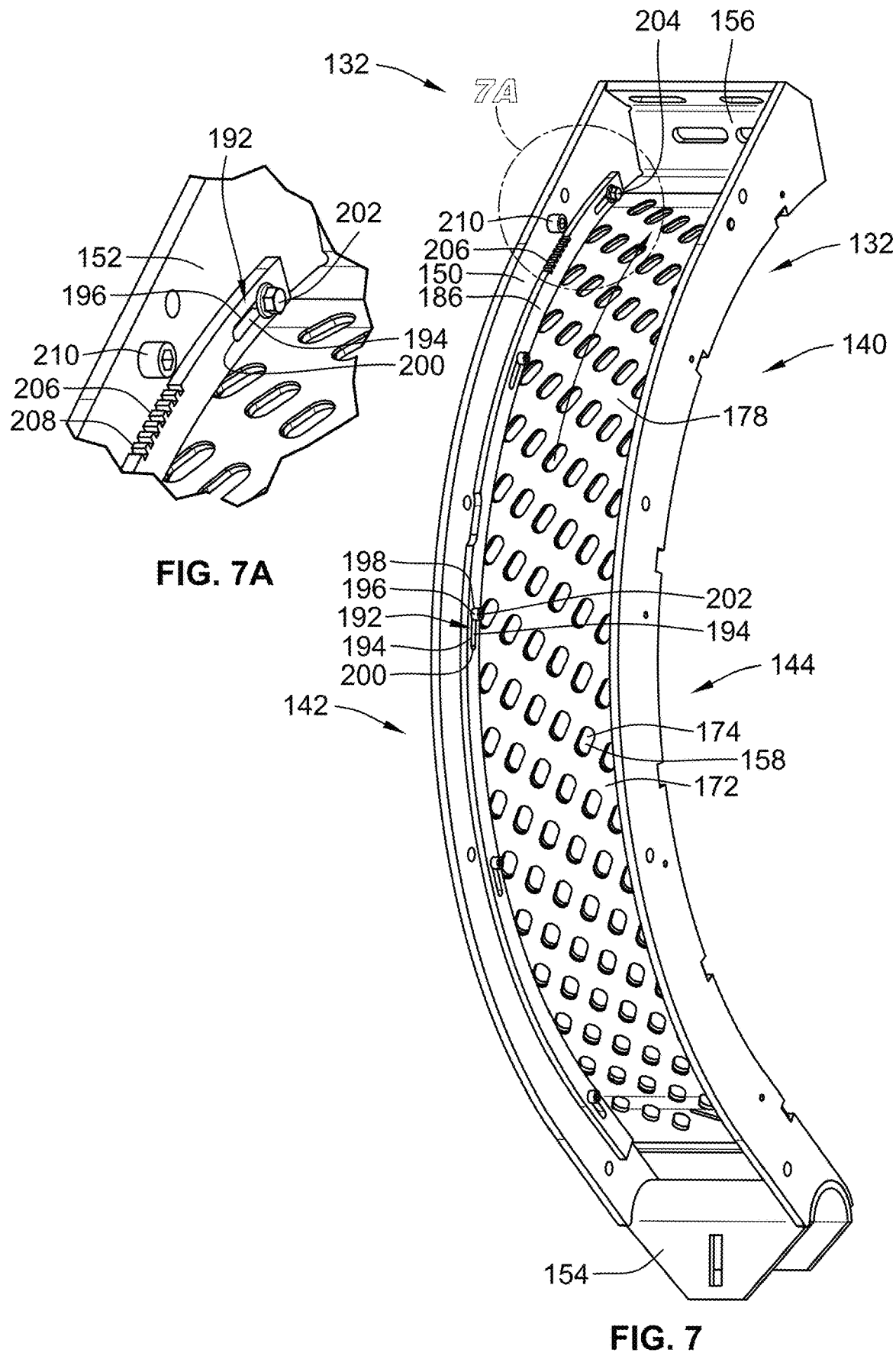
FIG. 7 is a rear perspective view of the concave section of FIG. 2 in a fully open first state that better illustrates the cover.

FIG. 7 illustrates a rear perspective view of the downstream side 144 of the concave section 132 of FIG. 2. FIG. 7 illustrates the cover 172 in a first state, which in this case is a fully open state. In the fully open state, the corresponding crop openings 174 are aligned with the crop passage openings 158 such that a threshed grain can pass through the entire crop passage opening 158 (FIG. 3) without obstruction by the solid cover portion 178. A slide assembly 192 secures the cover 172 to the concave body 140 to permit the cover 172 to be slideable relative to the concave body 140 to selectively cover at least some of the crop passage openings 158. The slide assembly 192 may be partially integrated into the cover (e.g. the rails 186, 188) and the concave body 140 (e.g. retainers).

The upstream side 142 may provide part of the slide assembly 192 that is structurally the same part on the downstream side 144. Slide assembly portions may be arranged to mirror those on the downstream side, but in embodiments, they may be arranged independently of the other. In an embodiment there may be between 1 and 10 slide assembly 192 component locations on each one of the upstream and downstream sides 142, 144. In a preferred embodiment there may be between 2 and 8 slide assembly 192 component locations on each one of the upstream and downstream sides 142, 144. In a more preferred embodiment there may be between 4 and 6 slide assembly 192 component locations on each one of the upstream and downstream sides 142, 144.

The slide assembly 192 may include a retainer slot 194 that in an embodiment may be defined by the rails 186, 188. The slide assembly 192 includes retainers such as a pin 196 for slideably securing the cover 172 to the concave body 140.

The retainer slot 194 may be in the form of an arcuate slot having a degree of curvature matching that of the arcuate support plate 160 (FIG. 3) and the cover plate 172. The retainer slot 194 has a first end 198 nearest the leading end plate assembly 154 and a second end 200 nearer the trailing end plate assembly 156. As illustrated, the cover 172 has been slid towards the trailing end plate assembly 156 to position first end 198 of the retainer slot 194 against the pin 196 to provide a fully open position for all the crop passage openings 158. Ends of the retainer slots may provide stops limiting movement and/or the cover 172 may also bottom out against structures 154, 156.

The retainer pin 196 may be any number of structures, for example a shoulder bolt or a bolt. In the embodiment illustrated a threaded portion of the shoulder bolt has passed through the retainer slot 194 to be received by the downstream side plate 152. A head 202 on the should bolt 196 has an outmost diameter exceeding that of the retainer slot 194 so as to keep the first rail 186 of the cover 172 slideably secured to the downstream side plate 152 of the concave body 140. Accordingly, the first rail 186 is sandwiched between the head 202 of the shoulder bolt 196 and the downstream side plate 152 to permit slideable movement of the retainer slot 194 under the head 202.

Further, a lock member 204 is arranged to lock the position of the cover 172 among the at least two different positions and fix the degree of openness when locked. The lock member 204 can be engaged and disengaged to provide an unlocked position allowing sliding movement of the cover 172. In the embodiment illustrated the lock member 204 is a fastener, also referred to as a lock fastener 204. The lock fastener 204 is threaded at one end and has a fastener head 206 at the other end. Turning the lock fastener 204 in a first direction such as within one of the retainer slots 194 loosens the fitment between the first rail 186 of the cover 172 and the downstream sideplate 152 such that the first rail 186 may be slid relative to the arcuate support plate 160 to provide for a greater or lesser degree of openness as desired. Turning the lock fastener 204 in the second direction locks the first rail 186 of the cover 172 against the downstream sideplate 152 to clamp and prevent slideable movement during use of the concave section 132. It is not the intent to limit embodiments to only fasteners, as other locking members/means are envisioned, for example, the lock member 204 may be a different type of clamp supported by the concave body 140, releasably clamping the cover 172 to the concave body 140.

FIGS. 7 and 7A illustrate a drive portion 206 on first rail 186 of the cover 172. The drive portion 206 may be located on one of or both the first and second side rails 186, 188 of the cover 188 (FIG. 6). Further, the first and second drive rails 186 in an embodiment may be define respective drive portions 206 that may be in the form of a gear rack comprising one or more drive lugs 208. The drive portion 206 is actuable to allow movement of the cover 172 relative to the concave body 140. By actuable it is meant that a force may be applied thereto to slide the cover 172 when in an unlocked position. The drive portion 206 may comprise at least one drive lug 208 provided by the cover 172.

A leverage member 210 is arranged relative to the drive lug 208 in a spaced relationship that allows a mechanic to manually adjust using a tool 212 (e.g. prybar or screwdriver) acting upon the drive lug 208 and the leverage member 210. More specifically, the leverage member 210 may be located on either or both of the upstream and downstream side plates 150, 152 generally proximate the drive portions 206 of the cover 172.

Figure 8:
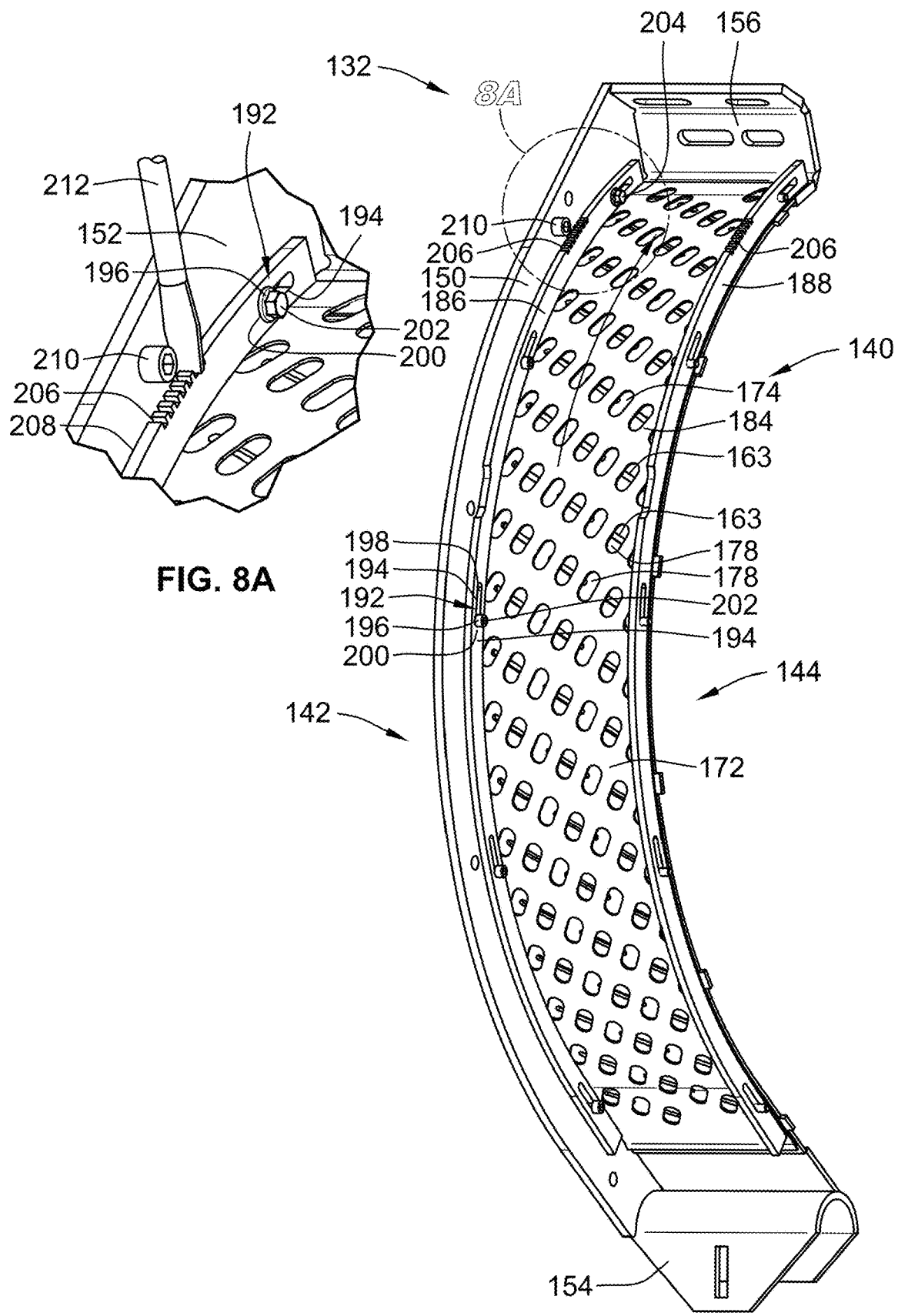
FIG. 8 is rear perspective view of the concave section of FIG. 2 in a second fully closed state.

FIG. 8, as with FIG. 7, illustrates a rear perspective view of the downstream side 144 of the concave section 132 of FIG. 2. However, FIG. 8 illustrates the cover 172 in a second state, also referred to as a fully closed state. In the fully closed state, the solid cover portion 178 is aligned to prevent threshed grain or MOG from passing through the crop passage openings 158 or the corresponding crop passage openings 174. Only the solid portion 178, the back of rub bars 162 are seen through crop passage openings 158. As illustrated, the cover 172 has been slid away from the trailing end plate assembly 156 and towards the leading end plate assembly 154 to position second end 200 of the retainer 194 against the pin 196.

Figure 9:
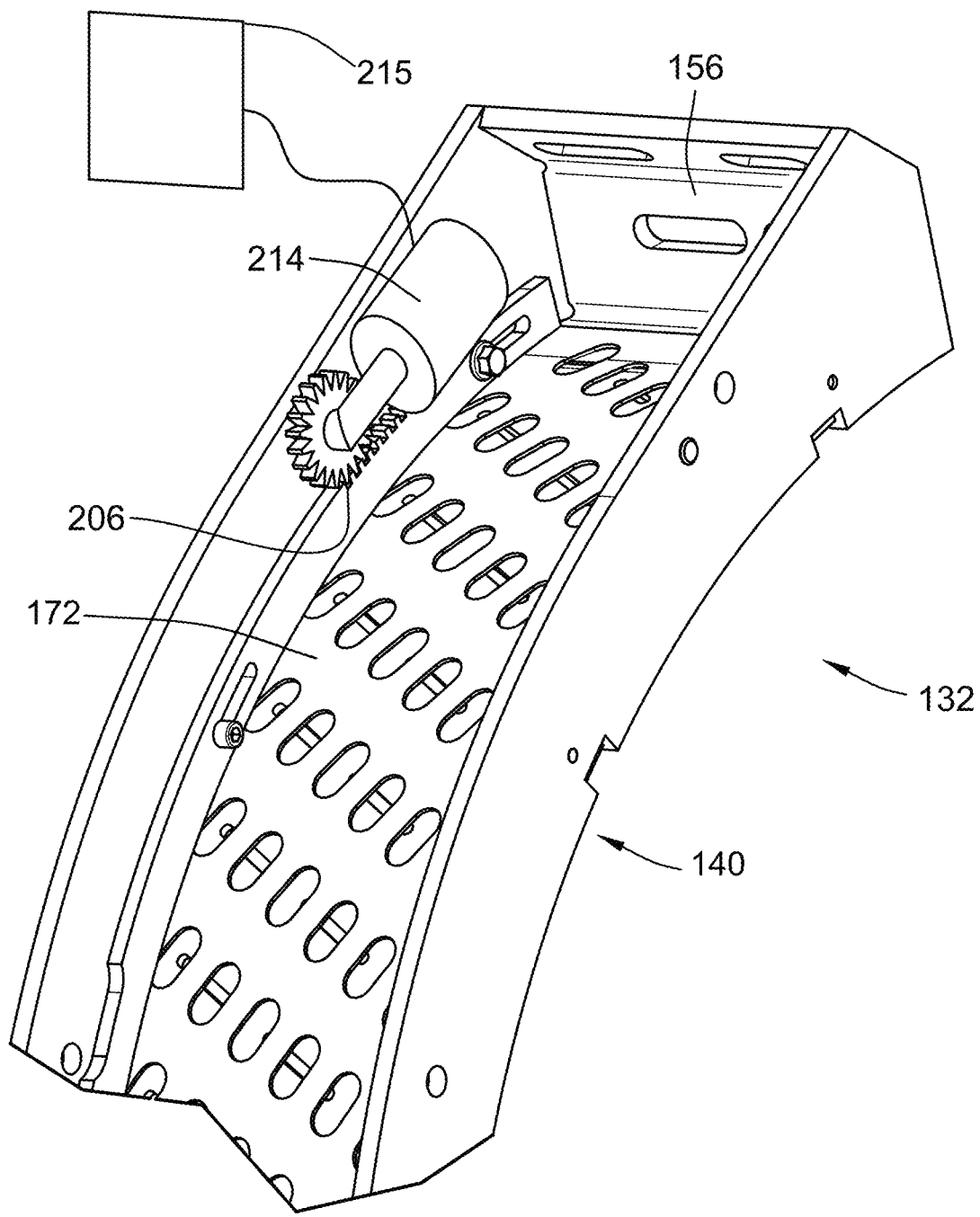
FIG. 9 is an enlarged partial rear perspective view of the concave section of FIG. 2 in the second state and an automatic means for movement of the cover.

FIG. 8A is an enlarged view of the area taken about the drive portion 206 of FIG. 8. Thus, FIG. 8A also illustrates the cover in a second state, wherein the plurality of crop passage openings 158 are fully closed. A tool 212 is illustrated acting upon the drive lug 208 and the leverage member 210 to move the cover 172 to the second state. As can now be readily appreciated, the cover 172 maybe slideably moved to at least one intermediate position only partially covering at least some of the crop passage openings 158. The cover 172 maybe moved to further intermediate positions between fully open and closed positions to partially cover at least some of the crop passage openings 158 with each intermediate position achieving a different level of partial coverage. Preferably, the cover 172 is infinitely adjustable relative to the concave body 140 to allow infinite coverage adjustment of the crop passage openings 158. However, discrete or stepped positions are also possible and may be marked on the concave section to correspond to select openness FIG. 9 illustrates an embodiment of the concave section 132 with the cover in a fully closed position utilizing an actuator 214 to engage the drive portion 206 to move the cover 172 either towards or away from the leading end plate assembly 154 to acquire the desired degree of openness of the crop passage openings 158 (FIG. 3). Such adjustment advantageously allows for the amount of threshing by adjusting the concave sections 132 in the harvester 100 (FIG. 1) without having to remove them from the harvester 100 and thereby advantageously saving time otherwise spent in removing the concave sections 132. Accordingly, manual means, such as the gear rack, drive lug 208 or a handle or other engagement surface can be provided by the cover 172 arranged and sized to acted upon by the tool 212 or operator to facilitate movement; and/or an actuator 214 may be utilized such as an electric, hydraulic or pneumatic servo actuator or stepper motor that acts on the cover 172 for automatic means. A remote controller 215 provides for the actuator 214 to be arranged for remote automated position control of the cover 172 relative to the concave body 140 to control the degree of openness.

Figure 11:
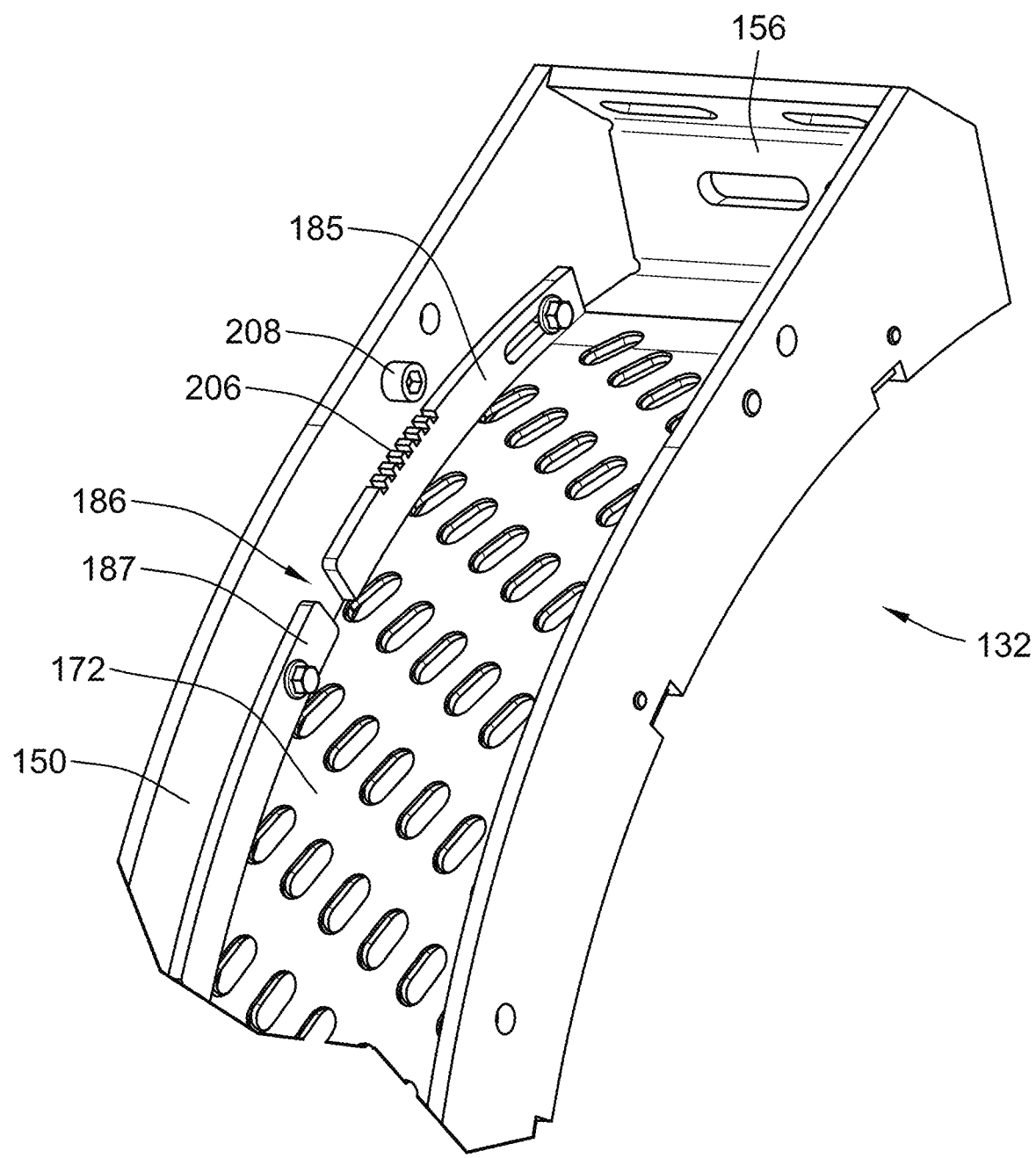
FIG. 11 is rear perspective view of the concave section of FIG. 2 with an alternative side rail arrangement.

FIG. 11 illustrates the concave section 132 but with an alternative arrangement for the first and second rails 186, 188. The same arrangement to be discussed relative to first rail 186 is applicable to second rail 188 (FIG. 7) although only first rail 186 is illustrated in FIG. 11. In this alternative arrangement, first rail 186 includes a first drive portion 185 separated and spaced apart from a first guide portion 187. The first drive portion 185 includes the drive portion 206. The first drive portion 185 may be attached, via weldment for example to the cover 172 or it may be integral therewith by way of non-limiting example. The first guide portion 187 may be fixed to upstream side plate 150 by weldment or other known means such that it acts as a slotted guide for the cover 172. Use of drive lug 208 in relation to drive portion 206 may be by manual or automated means as previously discussed.

FIG. 10 illustrates a concave section with a second embodiment of the crop engagement face 232 with a cover 272 (FIG. 10A) removed from behind the crop engagement face 232. The concave section of FIG. 10 is utilized in separator section 136 (FIG. 1). Crop engagement face 230 is similar in most respects to crop engagement face 130 (FIG. 2) except for the differences explained here. Crop engagement face 232 includes round bars 262, as previously discussed provide for a gentle separation of the grain from the material other than grain. The round bars 262 are used instead of the edged rub bars 162 (FIG. 2). Further, instead of the arcuate support plate 160 defining the crop passage openings 158, spaced apart adjacent round bars 262 define the crop passage openings 258 of the crop engagement face 230. Additionally, as can now be readily appreciated a cover 272 is located behind the round bars 262. The cover 272, defines corresponding crop openings 274 orientated in a pattern similar to that of the crop passage openings 258 with solid cover portion 278. Accordingly, as with the cover 170, cover 272 is moveable to infinitely adjustable the degree of openness of the crop passage openings 258.

Although not illustrated, it may now be readily understood that various embodiments utilizing a moveable cover can be used to match concaves having diverse crop engagement faces. Indeed, where a crop engagement face may utilize both rub bars and round bars but does not utilize an arcuate support plate, a cover plate can be provided behind the crop engagement face to control the degree of openness. Further, where a crop engagement face includes an arcuate support plate with rub bars, a cover can still be provided to inexpensively, control the degree of openness with an elegant light weight solution taking up minimal space in the harvester 100 (FIG. 1) to improve the amount of grain separated from material other than grain harvested and with the least amount of damage.

Figure 12:
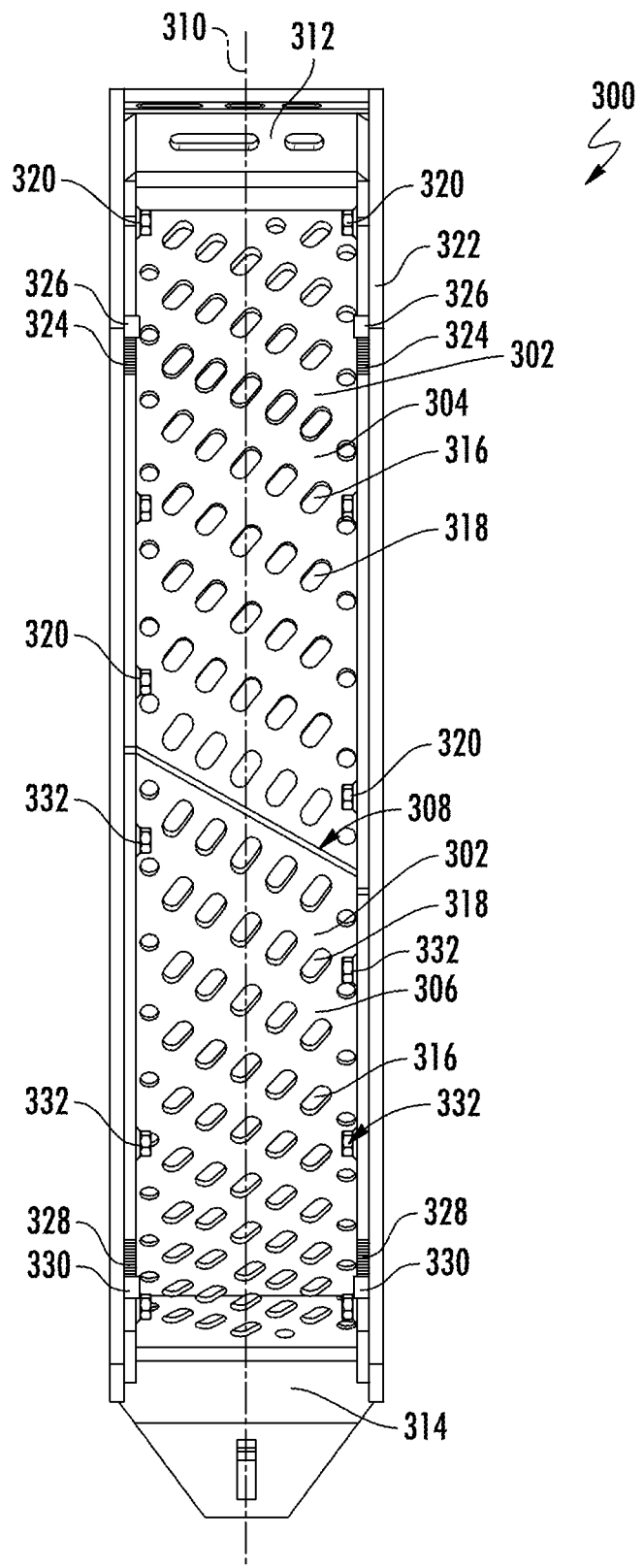
FIG. 12 is a rear view of another embodiment of a concave section in an open first state.

FIG. 12 is a rear view of another embodiment of a concave section 300 in a fully open first state. Concave section 300 is the same as the concave section 132 except cover 302 differs from cover 172 as described herein and as seen in FIG. 12. Cover 302 includes a first cover portion 304 and a second cover portion 306 which define break 308 between the first cover portion 304 and the second cover portion 306. The break 308 divides the cover 302 in different areas and preferably equal areas via separate pieces that are moveable independent of one another. Each cover portion 302 or 304 may be considered a "cover." For example, if only one of the two cover portions 302 or 304 is used, it is thereby covered, literally, by the broadest claims appended here to.

The break 308 runs in a direction that is transvers to a longitudinal axis 310 bisecting the trailing end plate assembly 312 and the leading end plate assembly 314. It can be readily appreciated that the break 308 may be perpendicular to the longitudinal axis 310 or of any orientation such that corresponding crop openings 316 are aligned to match an alternative crop engagement face on the front of the concave section 300 and/or an alternative arcuate support plate having a different arrangement of crop passage openings 318. As illustrated in the fully open position, the first cover portion 304 and the second cover portion 306 are aligned such that the crop openings 318 are in line with the corresponding crop openings 316 allowing for grain to pass therethrough.

A plurality of first slide assemblies 320, positioned and functioning as slide assembly 192 (FIG. 7), secure the first cover portion 304 to the concave body 322 and permit the first cover portion 304 to be slideable relative to the concave body 322 to selectively cover at least some of the crop passage openings 318.

First drive portions 324 are independently actuable utilizing first leverage members 326 which are positioned and function similar to leverage members 210 (FIG. 7) to allow for movement of the first portion 304 relative to the concave body 322 and the second portion 306. By independently actuable it is meant that actuation of any one of the single drive portions 324, for example by a tool (FIG. 8) or actuator (FIG. 9), is enough to move the first portion cover 304 and without movement of the second cover portion 306.

The first cover portion 304 is slideable in first and second directions parallel to the longitudinal axis 310. The first direction is movement towards the trailing end plate assembly 312 and the second direction is movement towards the leading end plate assembly 314. The first slide assemblies 320 limit the distance the first cover portion 304 moves in the first and second directions. In the fully open state, the first cover portion 304 has moved in the second direction towards the leading end plate assembly 314 to the maximum extent permitted by the first slide assemblies 320.

The second cover portion 306 is slideable in the first direction and the second directions parallel to longitudinal axis 310. Second drive portions 328 are independently actuable utilizing second leverage members 330 to move the second cover portion 306 in the first and second directions relative to the concave body 322 and the first cover portion 304. It should be readily apparent at this point that the first cover portion 304 and second cover portion 306 are moved independently of one another. Movement of the second cover portion 306 in the first and second directions is limited by second slide assemblies 332. In the fully open position the second cover portion 306 has been moved in the first direction towards the trailing end plate assembly 312 to the maximum extent permitted by the second slide assemblies 332.

In the fully open state, the corresponding crop openings 316 are aligned with the corresponding crop passage openings 318 such that threshed grain can pass through the entire crop passage opening 316 and corresponding crop passage openings 318 with minimal obstruction by solid portions of the first portion 304. By minimal it is meant that less than 5% of the crop passage openings 316 are obstructed. In a preferred embodiment less than 3% are obstructed and in a more preferred embodiment less than 1% are obstructed.

Figure 13:
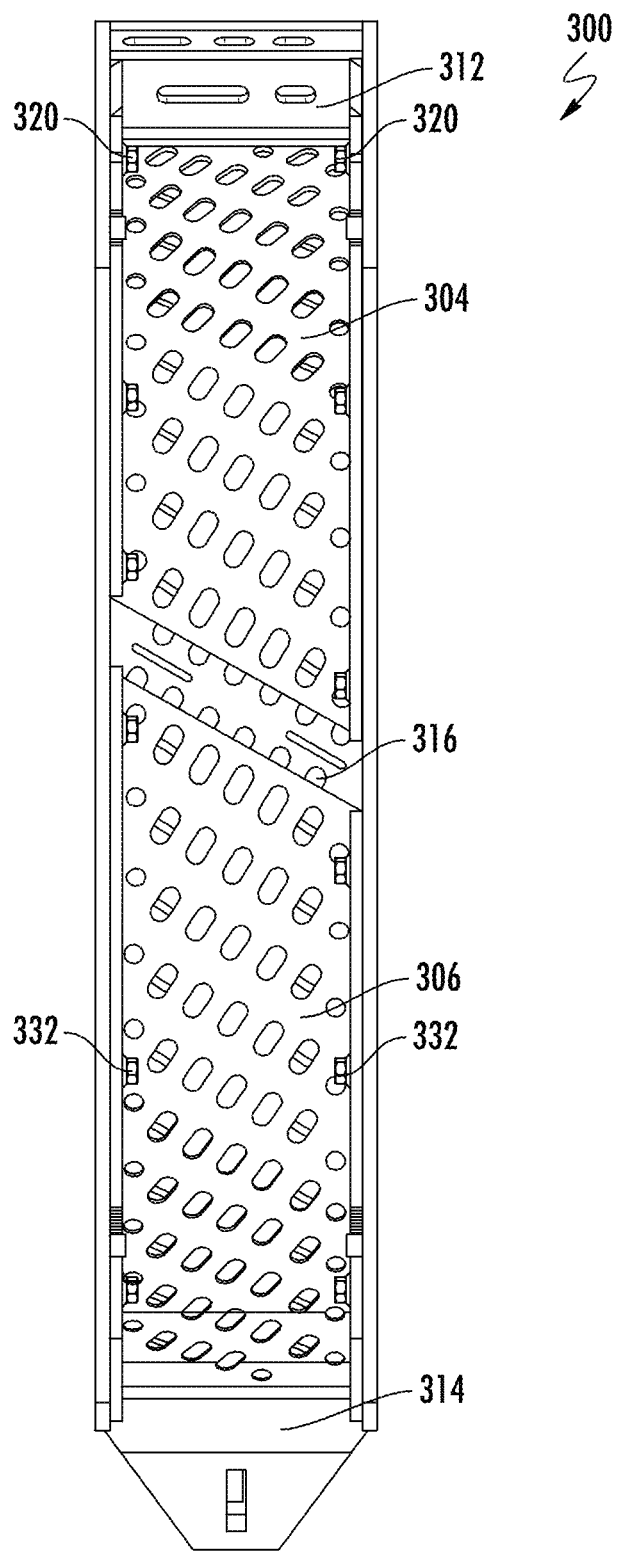
FIG. 13 is another rear view of the concave section of FIG. 12 but in a closed second state.

With attention now to FIG. 13, a second state of the concave section 300 is illustrated. The second state is a fully closed state wherein the first cover portion 304 has been moved in the first direction towards the trailing end plate assembly 312 to the greatest extent possible as limited by the first slide assemblies 320. The second cover portion 306 has been moved in the second direction, opposite the first direction, towards the leading end plate assembly 314 to the greatest extent possible as limited by the second slide assemblies 332. Thus, in the embodiment illustrated over 75% of the crop passage openings 316 are completely closed by solid portions of the first cover portion 304 and the second cover portion 306 of the cover 302. In a preferred embodiment 80% of the crop passage openings 316 are completely closed and in a preferred embodiment 90% or more of the crop passage openings 316 are completely closed.

Figure 14:
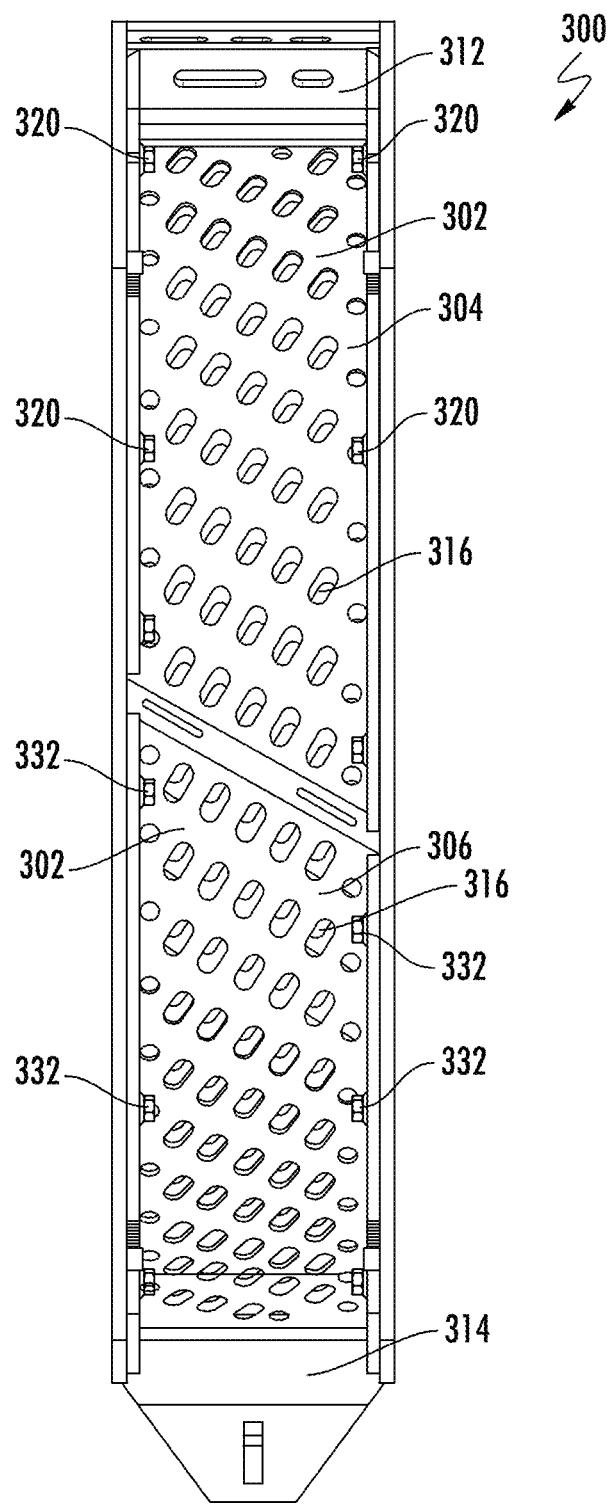
FIG. 14 is another rear view of the concave section of FIG. 12 but in a partially closed third state.

FIG. 14 illustrates a third state of the concave section 300. In the third state the first cover portion 304 has been moved in the first direction towards the trailing end plate assembly 312 to partially close the crop passage openings 316 and the second cover portion 306 has been moved in the second direction towards the leading end plate assembly 314 to partially close the crop passage openings 316. Retainer slots (see FIG. 7A at 192) of each the first slide assemblies 320 allow for movement of the first cover portion 304 in the first and second directions as limited by the retainer slots first and second ends. Thus, the first cover portion 304 is moveable in the first and second directions to positions proportional to the positions and distances between the first and second ends.

So too, the retainer slots (see FIG. 7A at 192) of each the second slide assemblies 332 allow for movement of the second cover portion 306 in the first and second directions as limited by the retainer slots first and second ends. Thus, the second cover portion 306 is moveable in the first and second directions to positions proportional to the positions and distances between the first and second ends.

Thus, it should be readily understood at this point that because the first cover portion 304 and the second cover portion 306 are moveable to many positions to cover and uncover the total area provide by the crop passage openings 316 then it provides the operator with a continuum of positions for the first cover portion 304 and the second cover portion 306 to adjust the threshing/separating efficiency vs. grain damage equation to optimize harvesting efficiency.

Cover 302 with the first cover portion 304 and second cover portion 306, also referred to as a segmented cover, allows for multi-threshing capability within a single concave 300 as well as among concaves 300. It is believed an additional benefit provided by the segmented cover 302 is that it will provided for more even distribution across the harvester's cleaning system, also referred to a cleaning shoe to provide for improved harvester efficiency. Further, the segmented cover 302 requires less force to adjust the position of the cover 302 relative to a single cover 172 (FIG. 7). Thus, the force to overcome friction resulting from crop residue is reduced and mass requiring movement is reduced.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A concave section for a harvester, comprising:
    a concave body having an upstream side, a downstream side, a leading end and a trailing end, and defining an arcuate crop engagement face facing radially inwardly;
    a plurality of crop passage openings defined through the arcuate crop engagement face;
    a cover configured to at least partially cover at least some of the crop passage openings, the cover carried by the concave body and movable thereon between at least two different positions to adjust a degree of openness of at least some of the crop passage openings;
    retainers acting between the cover and the concave and allowing movement of the cover on the concave body;
    an actuator arranged for remote automated position control of the cover relative to the concave body to control the degree of openness.

2. The concave section of claim 1, further comprising a slide assembly securing the cover to the concave body, the cover being slideable relative to the concave body to selectively cover at least some of the crop passage openings.

3. The concave section of claim 2, further comprising a lock member arranged to lock the position of the cover among the at least two different positions and fix the degree of openness when locked, the lock member having an unlocked position allowing sliding movement.

4. The concave section of claim 3, wherein the lock member comprises a clamp supported by the concave body, releasably clamping the cover to the concave body.

5. The concave section of claim 1, further comprising a drive portion on the cover, the drive portion being actuable by the actuator to allow movement of the cover relative to the concave body.

6. The concave section of claim 5, wherein the drive portion comprises at least one drive lug provided by the cover.

7. The concave section of claim 2, wherein the slide assembly is partially integrated into the cover and partially integrated into the concave body.

8. The concave section of 1, wherein the cover is slidable over the concave body in a circumferential direction to control the degree of openness.

9. The concave section of claim 1, wherein a plurality of rub bars define the arcuate crop engagement face, the rub bars extending laterally between the upstream side and the downstream side and arranged in spaced relation between the leading and trailing end, the openings being defined between adjacent rub bars, and wherein the cover is disposed radially outwardly of the rub bars.

10. The concave section of claim 9, further comprising an arcuate support plate radially outboard of the rub bars and supporting the rub bars, the arcuate support plate further defining the arcuate crop engagement face, the arcuate support plate defining the crop passage openings with a plurality of slots that are coverable between adjacent pairs of rub bars, wherein the cover is disposed radially outwardly of the arcuate support plate.

11. The concave section of claim 10, wherein the cover defines a plurality of corresponding slots, with a solid cover portion extending between corresponding slots, wherein the corresponding slots are arranged to align with the slots of the arcuate support plate to allow passage of crop material, and wherein the solid cover portion at least partially covers the slots of the arcuate support plate to at least partially close the slots of the arcuate support plate.

12. The concave section of claim 10, wherein the cover comprises a slotted cover plate, wherein the arcuate support plate has a first radial thickness; wherein the slotted cover plate has a second radial thickness; and wherein second radial thickness is thinner than the first radial thickness by between 10 and 75% of the first radial thickness.

13. The concave section of claim 1, wherein the concave body comprises:
    an upstream side plate providing the upstream side,
    a downstream side plate providing the downstream side,
    a leading end assembly providing the leading end
    a trailing end assembly providing the trailing end,
    wherein the upstream side plate and the downstream side plate extend in parallel relation between the leading end assembly and the trailing end assembly, and wherein the arcuate crop engagement face extends laterally between the upstream side plate and the downstream side plate, the cover comprising a slotted arcuate plate arranged behind the arcuate crop engagement face.

14. The concave section of claim 13, wherein the retainers retaining the slotted arcuate plate to the concave body, the slotted arcuate plate being slidable relative to concave body while retained thereto by the retainers.

15. The concave section of claim 14, wherein the retainers guide sliding movement of the arcuate plate in a circumferential direction between the leading end and the trailing end to adjust the degree of openness.

16. The concave section of claim 1, wherein the cover has a fully open position on the concave body maintaining the crop passage openings at the degree of openness that is fully open and a closed position on the concave body maintaining the crop passage openings at the degree of openness that is fully closed.

17. The concave section of claim 16, wherein the cover is further movable on the concave body between at least one intermediate position between fully open and closed positions, the cover when in at least one intermediate position only partially covering at least some of the crop passage openings.

18. The concave section of claim 1, wherein the cover is configured to at least partially cover all of the crop passage openings.

19. A harvester including the concave section of claim 1, the harvester including a vehicle having a bin;
a head at a front of the vehicle for engaging a crop to remove crop material;
a rotor interposed between the bin and the head, the rotor proximate the concave section in a concave region, the concave region comprising at least 4 concave sections arranged in downstream fashion from leading threshing concaves closest to the head to trailing separating concaves farthest from the head,
the rotor having a spiral engaging element facing the concave section operable to impart a rotational spiral flow of crop material against a first of the four leading threshing concave; and
wherein the degree of openness controls and optionally limits an amount of threshing occurring in said one of the leading threshing concaves.

20. The concave section of claim 1, wherein the actuator is electric, hydraulic, or pneumatic.

21. The concave section of claim 1, wherein the actuator is a servo actuator or a stepper motor.

22. A concave section for a harvester, comprising:
a concave body having an upstream side, a downstream side, a leading end and a trailing end, and defining an arcuate crop engagement face facing radially inwardly;
a plurality of crop passage openings defined through the arcuate crop engagement face;
a cover configured to at least partially cover at least some of the crop passage openings, the cover carried by the concave body and movable thereon between at least two different positions to adjust a degree of openness of at least some of the crop passage openings;
an actuator arranged for remote automated position control of the cover relative to the concave body to control the degree of openness;
wherein the concave body comprises:
an upstream side plate providing the upstream side,
a downstream side plate providing the downstream side,
a leading end assembly providing the leading end
a trailing end assembly providing the trailing end,
wherein the upstream side plate and the downstream side plate extend in parallel relation between the leading end assembly and the trailing end assembly, and wherein the arcuate crop engagement face extends laterally between the upstream side plate and the downstream side plate, the cover comprising a slotted arcuate plate arranged behind the arcuate crop engagement face;
the concave section further comprising retainers retaining the slotted arcuate plate to the concave body, the slotted arcuate plate being slidable relative to concave body while retained thereto by the retainers;
wherein the retainers comprise a plurality of shoulder bolts having head portions over the slotted arcuate plate to retain the slotted arcuate plate to the concave body, and a lock fastener releasably locking the slotted arcuate plate to the concave body.

23. A concave section for a harvester, comprising:
a concave body defining a plurality of crop passage openings;
a cover movably mounted to the concave body, the cover being movable between a first position on the concave body and a second position on the concave body to selectively uncover or cover of at least some of the crop passage openings, wherein the cover has a constant non-adjustable width and a constant non-adjustable length during movement between the first position and the second position;
retainers acting between the cover and the concave body and allowing movement of the cover on the concave body;
wherein the first position is a fully open position on the concave body maintaining the crop passage openings at the degree of openness that is fully open and the second position is a closed position on the concave body maintaining the crop passage openings at the degree of openness that is fully closed;
further comprising a plurality of intermediate positions between fully open and closed positions, the cover when in at least one intermediate positions only partially covering at least some of the crop passage openings, with each intermediate position achieve a different level of partial coverage.

24. The concave section of claim 23, wherein the cover is infinitely adjustable relative to the concave body to allow infinite coverage adjustment of the crop passage openings.

25. The concave section of claim 23, further comprising means for manually or automatically actuating movement of the cover between first and second positions.

26. A concave section for a harvester, comprising:
a concave body defining a plurality of crop passage openings;
a cover movably mounted to the concave body, the cover being movable between a first position on the concave body and a second position on the concave body to selectively uncover or cover of at least some of the crop passage openings, wherein the cover has a constant non-adjustable width and a constant non-adjustable length during movement between the first position and the second position;
retainers acting between the cover and the concave body and allowing movement of the cover on the concave body;
the cover including a slotted arcuate plate, the concave section further comprising the retainers retaining the slotted arcuate plate to the concave body, the slotted arcuate plate being slideable relative to concave body while retained thereto by the retainers.

27. A concave section for a harvester, comprising:
a concave body defining a plurality of crop passage openings;
a cover movably mounted to the concave body, the cover being movable between a first position on the concave body and a second position on the concave body to selectively uncover or cover of at least some of the crop passage openings, wherein the cover has a constant non-adjustable width and a constant non-adjustable length during movement between the first position and the second position;
retainers acting between the cover and the concave body and allowing movement of the cover on the concave body;

further comprising a lock member arranged to lock the position of the cover among first and second positions and fix the degree of openness when locked, the lock member having an unlocked position allowing sliding movement.

28. A concave section for a harvester, comprising:
a concave body defining a plurality of crop passage openings;
a cover movably mounted to the concave body, the cover being movable between a first position on the concave body and a second position on the concave body to selectively uncover or cover of at least some of the crop passage openings, wherein the cover has a constant non-adjustable width and a constant non-adjustable length during movement between the first position and the second position;
retainers acting between the cover and the concave body and allowing movement of the cover on the concave body;
further comprising an actuator arranged to engage a drive portion of the cover to move the cover between the first position and the second position.

29. A concave section for a harvester, comprising:
a concave body defining a plurality of crop passage openings;
a cover movably mounted to the concave body, the cover being movable between a first position on the concave body and a second position on the concave body to selectively uncover or cover of at least some of the crop passage openings, wherein the cover has a constant non-adjustable width and a constant non-adjustable length during movement between the first position and the second position;
retainers acting between the cover and the concave body and allowing movement of the cover on the concave body;
further comprising a slide assembly securing the cover to the concave body to facilitate sliding movement between first and second positions, wherein part of the slide assembly is integrated into the cover and part of the slide assembly is integrated into the concave body.

30. A concave section for a harvester, comprising:
a concave body defining a plurality of crop passage openings;
a cover movably mounted to the concave body, the cover being movable between a first position on the concave body and a second position on the concave body to selectively uncover or cover of at least some of the crop passage openings, wherein the cover has a constant non-adjustable width and a constant non-adjustable length during movement between the first position and the second position;
retainers acting between the cover and the concave body and allowing movement of the cover on the concave body;
wherein the cover comprises first and second mounting rails and a perforate arcuate cover plate, the first and second mounting rails extending from the perforate arcuate cover plate in a direction away from the concave body.

31. A concave section for a harvester, comprising:
a concave body defining a plurality of crop passage openings;
a cover movably mounted to the concave body, the cover being movable between a first position on the concave body and a second position on the concave body to selectively uncover or cover of at least some of the crop passage openings, wherein the cover has a constant non-adjustable width and a constant non-adjustable length during movement between the first position and the second position;
retainers acting between the cover and the concave body and allowing movement of the cover on the concave body;
wherein the cover defines corresponding crop openings aligned with the crop passage openings, wherein all of the of the corresponding crop openings of the cover remain exposed to a back side of the concave body in all positions of the cover on the concave body.

* * * * *